US009674788B2

(12) United States Patent
Shahar et al.

(10) Patent No.: US 9,674,788 B2
(45) Date of Patent: Jun. 6, 2017

(54) DEVICES AND METHODS FOR TRANSMIT CONCURRENCY BY CONDITIONED SIGNAL COMBINING

(71) Applicant: Intel IP Corporation, Santa Clara, CA (US)

(72) Inventors: Itzik Shahar, Kadima (IL); Anthony Tsangaropoulos, San Carlos, CA (US); Ilan Sutskover, Hadera (IL); Brian Sublett, Santa Rosa, CA (US); Dongsheng Bi, Fremont, CA (US); Ronen Kronfeld, Shoham (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/752,103

(22) Filed: Jun. 26, 2015

(65) Prior Publication Data
US 2016/0381641 A1 Dec. 29, 2016

(51) Int. Cl.
H04W 52/04 (2009.01)
H04W 4/00 (2009.01)
H04W 84/12 (2009.01)

(52) U.S. Cl.
CPC .......... *H04W 52/04* (2013.01); *H04W 4/008* (2013.01); *H04W 84/12* (2013.01)

(58) Field of Classification Search
CPC ..... H04W 52/00–52/60; H04W 4/008; H04W 84/12
USPC .......................................... 455/522; 370/318
See application file for complete search history.

(56) References Cited

U.S. PATENT DOCUMENTS

| 6,557,085 B1 | 4/2003 | Mattausch |
| 2010/0008338 A1 | 1/2010 | Tsfati et al. |
| 2010/0316027 A1 | 12/2010 | Rick et al. |
| 2011/0075596 A1* | 3/2011 | Moreira ............... H04W 72/02 370/310 |
| 2012/0275319 A1* | 11/2012 | Peiris .................. H04M 1/7253 370/252 |
| 2014/0227984 A1 | 8/2014 | Tran et al. |
| 2016/0276983 A1* | 9/2016 | Vaillancourt ........... H03F 3/195 |

OTHER PUBLICATIONS

"International Application Serial No. PCT/US2016/034264, Written Opinion mailed Sep. 6, 2016", 6 pgs.

* cited by examiner

Primary Examiner — Raymond Dean
(74) Attorney, Agent, or Firm — Schwegman Lundberg & Woessner, P.A.

(57) ABSTRACT

Embodiments pertain to systems, methods, and component devices for Tx-Tx transmit concurrency by combining signals before power amplification. One example embodiment includes validity check circuitry configured to check a transmission power for a Bluetooth signal against a first threshold transmission power, a Bluetooth Power Amplifier, and a WLAN power amplifier. A switching network controlled by the validity check circuitry and configured to couple the Bluetooth input to Bluetooth power amplifier input when the transmission power for the Bluetooth signal is above the first threshold transmission power and to couple the Bluetooth signal with a WLAN signal for input to the shared WLAN power amplifier when the transmission power for the Bluetooth signal is less than the first threshold transmission power.

12 Claims, 7 Drawing Sheets the RF wireless connection 122 to the second wireless communication device 110 and the RF wireless connection 124 to a wireless communication device 130.

DEVICES AND METHODS FOR TRANSMIT CONCURRENCY BY CONDITIONED SIGNAL COMBINING

TECHNICAL FIELD

Some embodiments pertain to systems, methods, and devices associated with wireless communications and, in particular, to Tx-Tx transmit concurrency (TTC) where two signals to be transmitted, such as a Bluetooth™ signal and a wireless local area network (WLAN) signal, may be combined prior to input of the combined signal to a power amplifier (PA).

BACKGROUND

Wireless mobile communication technology uses various standards and protocols to transmit data. Some devices may use multiple different types of transmission systems operating under different standards and protocols, and operating at the same time. In certain environments, this simultaneous operation may cause complications in device operation.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
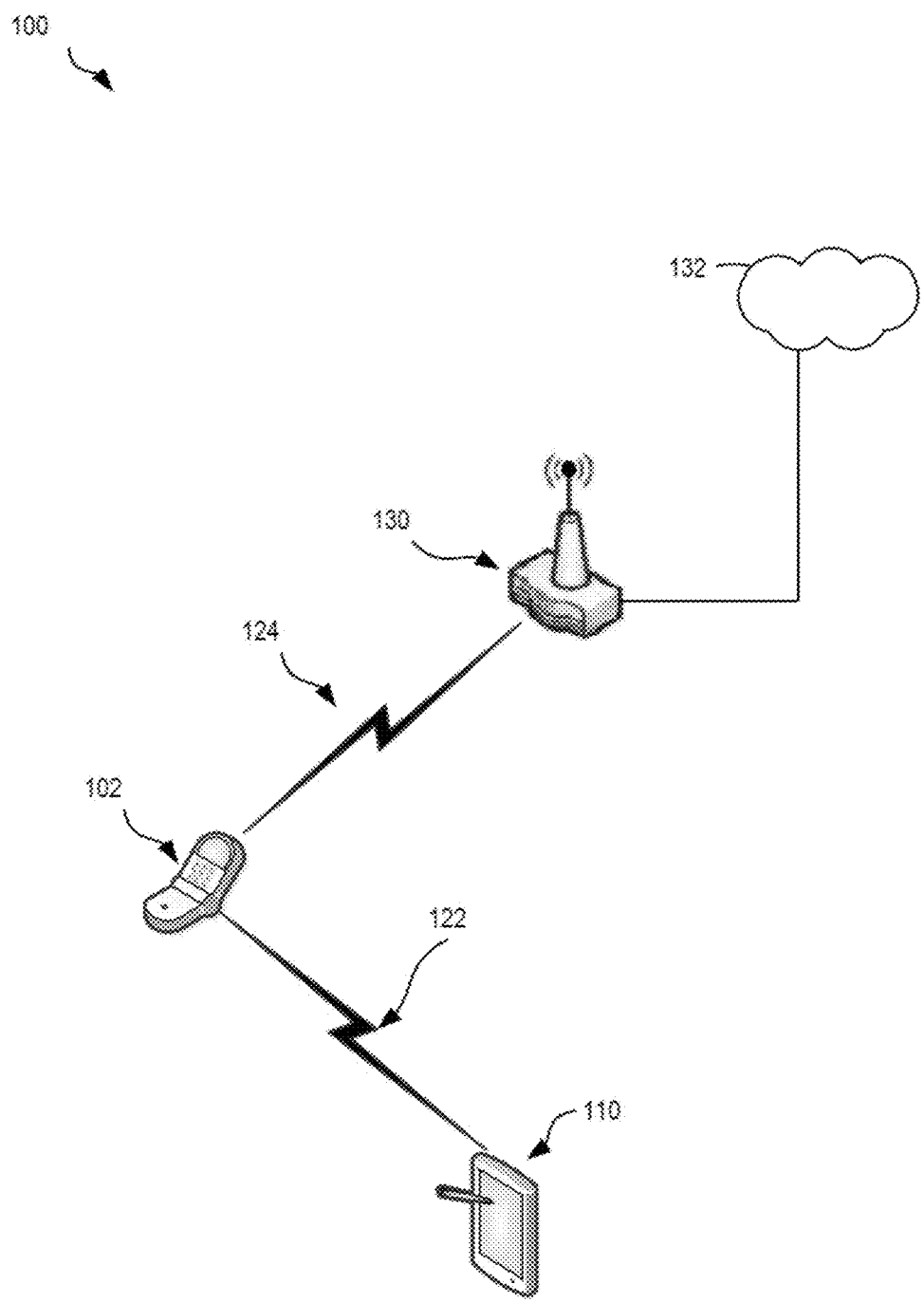
FIG. 1 illustrates a block diagram of a network which may be used in transmit concurrency by conditioned signal combining in accordance with some example embodiments.

FIG. 1 illustrates a block diagram of a network 100 which may be used in transmit concurrency by digital signal combining in accordance with some example embodiments. The network 100 includes a first wireless communication device 102 and a second wireless communication device 110. The wireless communication devices 102 and 110 may be, for example, laptop computers, smart phones, tablet computers, printers, wearable devices, machine-type devices such as smart meters or networked appliances, or any other wireless device with or without a user interface.

The first wireless communication device 102 has radio frequency (RF) wireless connections 122 and 124, with the RF wireless connection 122 to the second wireless communication device 110 and the RF wireless connection 124 to a wireless communication device 130.

Additionally, as illustrated, the example embodiment of network 100 shows the first wireless communication device 102 connecting to a broader network 132 such as the Internet via the RF wireless connection 124 to the wireless communication device 130. In some embodiments, the wireless communication device 130 may be a WLAN router providing network communications according to Institute of Electrical and Electronic Engineers (IEEE) 802.11 networking standards. Example WLAN signals as part of such an RF wireless connection in some embodiments may use peer-to-peer or access-point-based connections with collision avoidance. Example WLAN signals may further use orthogonal frequency division multiplexing (OFDM) with various modulation schemes, such as binary phase-shift keying, quadrature phase-shift keying, or quadrature amplitude modulation.

In other embodiments, the wireless communication device 130 may provide network communications according to other communication standards. Similarly, in some embodiments, the RF wireless connection 122 may be a connection using Bluetooth standard communications. Example Bluetooth signals as part of such an RF wireless connection in some embodiments may be an asynchronous connectionless link (ACL) using a polling time division multiple access scheme. Another example Bluetooth signal may be a synchronous connection-oriented link comprising a set of reserved timeslots on an existing ACL. In other embodiments, other communication standards may be used for both the first RF wireless connection 122 and the second RF wireless connection 124.

In various connectivity solutions for wireless communication devices such as the wireless communication device 102, circuitry for multiple communication types may be implemented on a single apparatus, which may be a single assembly or a single integrated circuit. In some embodiments, for example, WLAN and Bluetooth devices are collocated on the same silicon die. Embodiments described herein use a system framework to support concurrent operation of different RF signals, such as WLAN and Bluetooth signals, sharing a single transmission (Tx) path on the same (shared) antenna. In various embodiments, this may improve the overall performance of both WLAN and Bluetooth. For example, by sharing the antenna resources and enabling Tx-Tx concurrency for both WLAN and Bluetooth signals, the system framework may avoid delays in transmission while one transmission of one type (e.g., WLAN) waits for another transmission of another type (e.g., Bluetooth) to finish.

Due to differences in transmitted power or voltage level at the power amplifier output which could cause damage to a "weaker" power amplifier, power levels for the Tx signals are managed. For example, in some embodiments, a Bluetooth power amplifier is weaker than a WLAN power amplifier, and the system may be structured to avoid damage to the Bluetooth power amplifier and share the WLAN power amplifier when possible without damaging the WLAN power amplifier. This provides benefits over previous systems, where the two RF communication systems need to be operated in a mutually exclusive fashion (e.g., when a WLAN link needs to operate the transmitter portion of the radio, the Bluetooth transmitter is not allowed to turn on.)

In a system using WLAN and Bluetooth signals, in order to provide for Tx-Tx concurrency (TTC), a method of combining the transmit signals of the two systems into one Tx path needs to be established. In order to avoid damage to the power amplifiers, such a method conditionally enables combining the signals of the two RF systems, with careful coordination to ensure that the following system constraints are met: WLAN signal quality (e.g., EVM and SNR); Bluetooth signal quality (e.g., DEVM for EDR and SNR); and overall spurious emissions and noise.

Embodiments described herein for WLAN and Bluetooth enable a wireless communication device such as the wireless communication device 102 to operate combining the WLAN and Bluetooth transmit signals at the input of the WLAN power amplifier. The wireless communication device may then transmit the composite signal via the WLAN power amplifier, RF front end, and shared antenna, while proactively preventing any potential breach of regulatory or certification requirements described above using validity check circuitry along with other circuitry to perform pre-power-amplifier combining TTC.

This includes benefits over TTC based on post-combining, as post-combining requires very delicate RF design and tuning to ensure that the power amplifier (PA) output impedance is matched at all transmit power levels. Post-combining TTC also includes reliability degradation risks since a WLAN PA voltage output could be very high and damage the Bluetooth PA output transistors. These issues are overcome through the use of pre-power-amplifier combining TTC as described in association with various embodiments herein.

Figure 2:
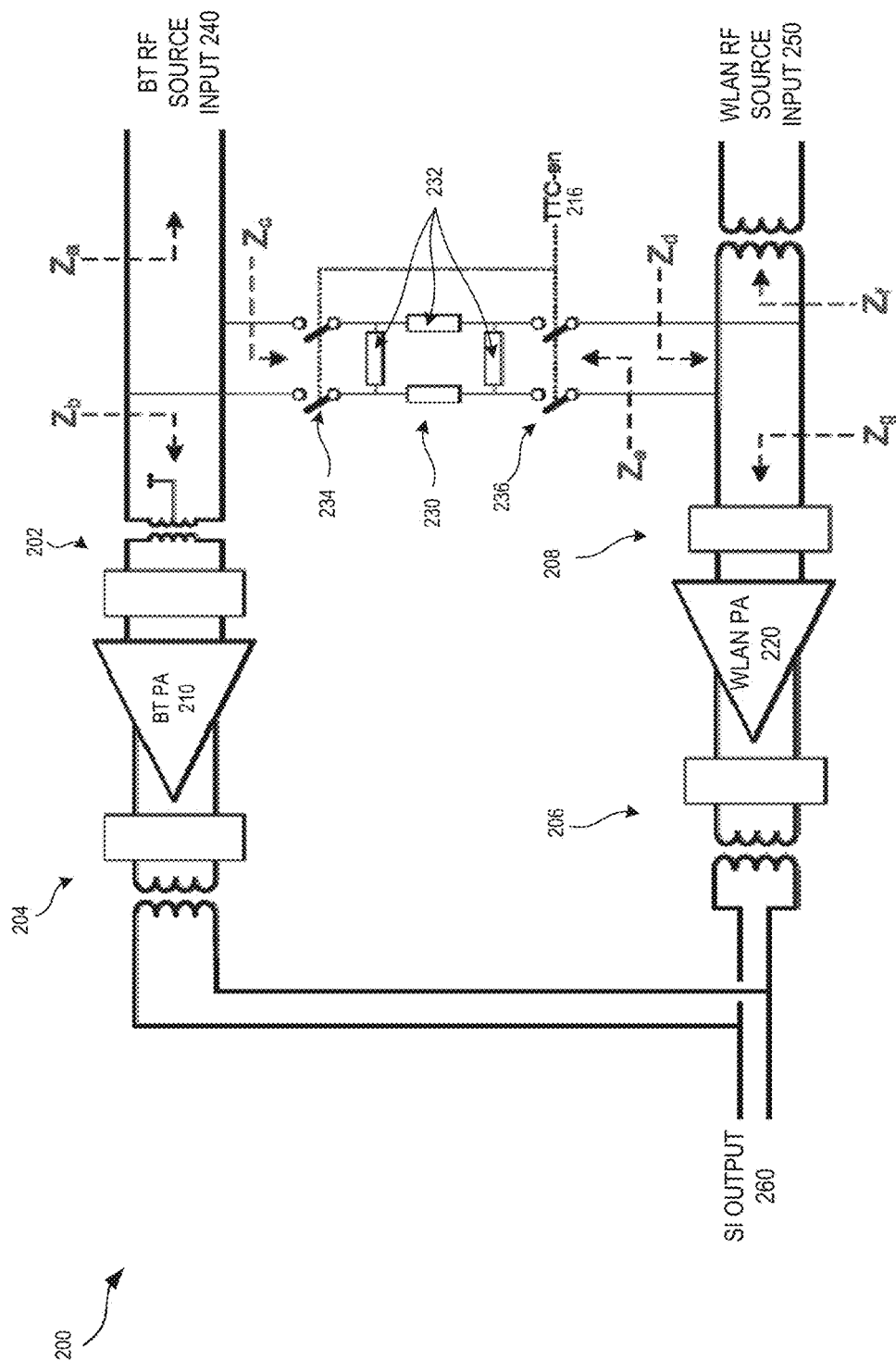
FIG. 2 illustrates one implementation of signal combining circuitry in accordance with some example embodiments

FIG. 2 illustrates one implementation of signal combining circuitry in accordance with some example embodiments as part of an apparatus 200 that may be used by a wireless communication device such as the wireless communication device 102. The apparatus 200 includes a Bluetooth power amplifier 210, a WLAN power amplifier 220, and switching network 230 circuitry. Additionally, the apparatus 200 includes matching circuitry 202, 204, 206, and 208, a Bluetooth RF source input 240, a WLAN RF source input 250, and an output for connectivity to an antenna shown as silicon output 260. The apparatus 200 enables TTC coupling using the switching network 230 to route the Bluetooth RF signal from a Bluetooth RF source (e.g., an RF digital to analog converter (DAC)) to the WLAN power amplifier 220 instead of to the Bluetooth power amplifier 210. Proper impedances at the inputs to both the Bluetooth power amplifier 210 and the WLAN power amplifier 220 are maintained through design of the impedances shown as $Z_a$ through $Z_g$ using standard impedance matching with the switching network 230 as coupled at one end to the Bluetooth RF source input 240 and the Bluetooth power amplifier 210, and as coupled at the other end to the WLAN RF source input 250 and WLAN power amplifier 220.

The switching network 230 is illustrated as a network of impedances 232. Two sets of in-line switches are shown, a first set of switches 234 at the source and a second set of switches 236 at the summing point. The switches 234, 236 are controlled by a TTC enable 216 signal or switch control. In some embodiments, the impedances are optimized such that the WLAN signal power in both standalone operation when the switches 234, 236 are open and in TTC operation when the switches 234, 236 are closed is not affected by the operation of the switching network 230. The impedances are also selected such that the Bluetooth signal power is not significantly affected by the parasitics of the switching network 230 in standalone operation when the switches 234, 236 are in the open position. In various embodiments, the signal power is considered not significantly affected when the signal is not distorted or modified in a way that increases an error rate in a way that is unacceptable to system performance. In some embodiments, this may mean that no increased error rate is allowable. In other embodiments, this may mean that errors are increased within an error tolerance threshold. While the switching network 230 is one possible way of implementing a TTC coupler, it will be apparent that other switching networks and implementations of TTC couplers are possible.

Figure 3:
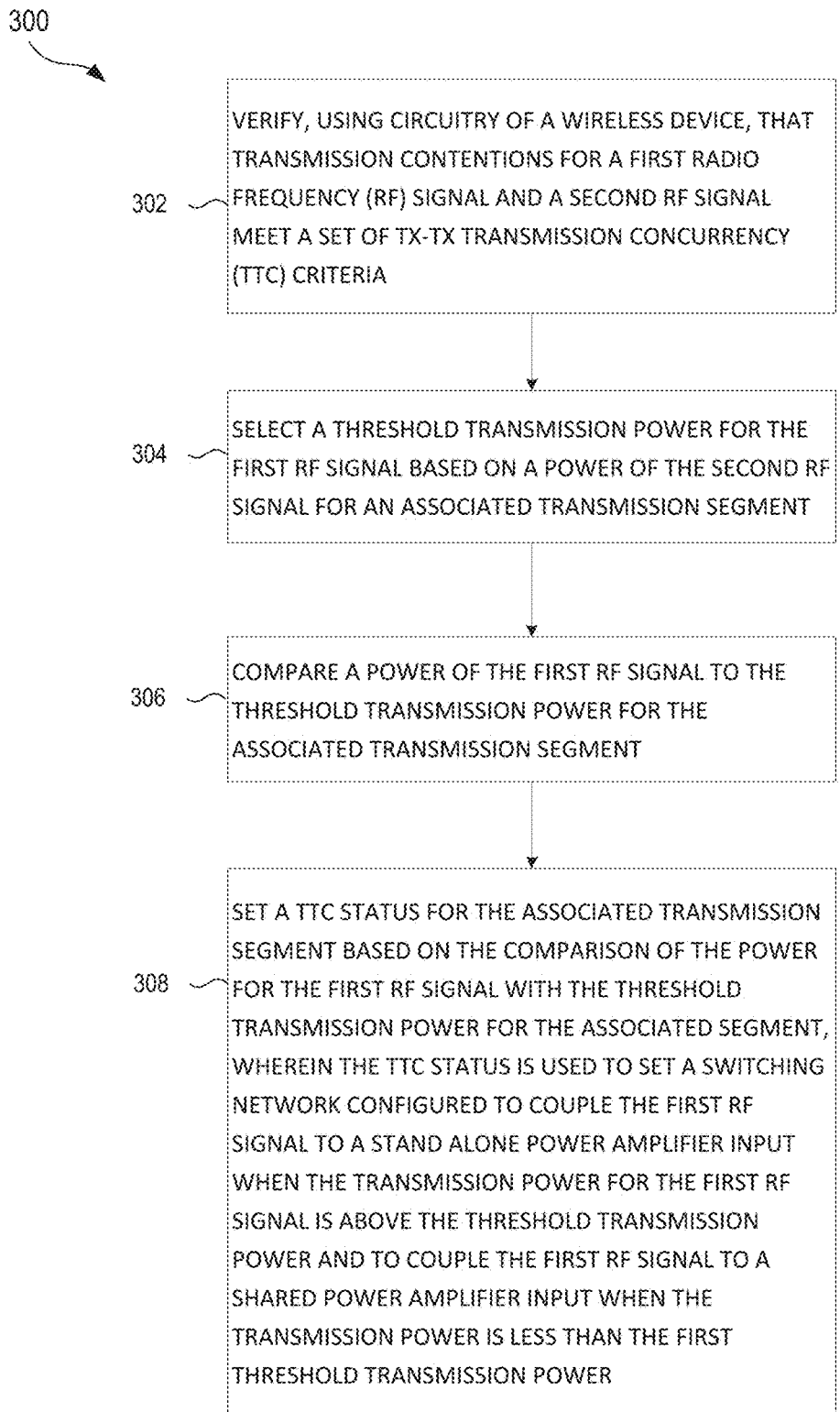
FIG. 3 illustrates aspects of a method for transmit concurrency by conditioned signal combining in accordance with some example embodiments.

FIG. 3 illustrates an example method 300 for performing TTC according to some example embodiments. In various embodiments, the method 300 of FIG. 3 is performed by the operation of circuitry or one or more processors operating as part of a wireless communication device such as the wireless communication device 102. This may include implementation in hardware, firmware, software, or any combination of these to implement the method 300 on a device.

In operation 302, a wireless communication device verifies that transmission contentions for a first radio frequency (RF) signal and a second RF signal meet a set of Tx-Tx transmission concurrency (TTC) criteria. The TTC criteria at a basic level may simply be verifying by an analysis of resource usage that conflicts between transmissions using the first RF signal and the second RF signal occur frequently enough to make any trade-offs with TTC operation worthwhile. The benefits, as discussed above, include the ability to transmit RF signals simultaneously instead of requiring one RF signal to wait. Combining two RF signals into the same non-ideal power amplifier incurs several potential risks, mainly due to potential intermodulation and cross-modulation, which in turn may cause performance degradation. This degradation may include creation of out-of-band or band-edge emissions that exceed the regulatory limits associated with device RF emissions. In an embodiment where the first RF signal is a Bluetooth signal and the second RF signal is a WLAN signal, the WLAN transmitter may employ predistortion to improve the power amplifier efficiency. Adding the Bluetooth signal may cause a mismatch between the WLAN transmitter's desired transmit power (index) and the actual input transmit power. Thus, the predistortion calibration that is standard for the WLAN operation may no longer apply and be consistent with the WLAN input signal. This mismatch causes phase and amplitude errors, which translate into degradation in error vector magnitude (EVM for WLAN and dEVM for Bluetooth), decrease in Tx efficiency, and therefore degradation in Tx throughput. Some aspects of these issues, and whether these issues may be properly accommodated during TTC operation given the current signals, may be considered during an initial determination regarding TTC criteria.

A threshold transmission power for the first RF signal is then selected based on the power of the second RF signal for an associated transmission segment in operation 304. In a WLAN and Bluetooth embodiment, the system identifies the WLAN transmission power expected during a certain transmission time, and then selects a threshold transmission power for the Bluetooth signal. This allows the system to determine when the combined power of the WLAN signal and the Bluetooth signal would be excessive and could potentially damage the WLAN power amplifier if the signals are combined. The threshold transmission power may be selected based on circuit parameters, or may be an adjustable setting that is managed via a user interface of a wireless communication device. Using this information from operation 304, the power of the first RF signal is identified in operation 306 and compared to the threshold transmission power for the associated transmission segment.

In operation 308, a TTC status is set based on operations 304 and 306. The TTC status may, for example, be a signal communicated via the TTC enable 216 connection controlling a switching network such as the switching network 230 as discussed above for the apparatus 200 of FIG. 2. The TTC status is used to set a switching network configured to couple the first RF signal to a standalone power amplifier such as the Bluetooth power amplifier 210 when the transmission power for the first RF signal is above the threshold transmission power and to couple the first RF signal to a shared power amplifier such as the WLAN power amplifier 220 when the transmission power is less than the threshold transmission power. In various embodiments, setting the TTC status enables and disables TTC operation according to various TTC criteria to ensure that constraints, both regulatory and certification metric based (e g limitations based on regulatory or certification standards), are met at all times during TTC operation. In various embodiments this is ensured through selecting WLAN Tx power (in dBm) according to WLAN need. In such an embodiment, the maximum allowed Bluetooth Tx power is set as a function of WLAN Tx power-X dB (where X is a figure determined by a degradation margin). The Bluetooth Tx power (in dBm) and rate are conveyed to WLAN TTC monitoring circuitry, and the WLAN TTC monitoring circuitry checks whether the current Bluetooth Tx power is lower or higher than the allowed TTC threshold; if it is higher, TTC is temporarily disallowed and a packet transmit arbiter manages conflicts between transmissions of Bluetooth and WLAN signals. Upon completion of the packet transmission, TTC resumes and the process repeats for another transmission segment (e.g., a separate time period with new data and associated Tx power for both WLAN and Bluetooth transmissions.)

In certain embodiments, the degradation margin discussed above is set based on characteristics of the RF signals. For example, in certain embodiments, WLAN RF signals include much larger variations in power or peak-to-average ratio than the corresponding values in Bluetooth signals. To increase the efficient usage of the WLAN power amplifier, the WLAN power amplifier may be implemented with predistortion circuitry. The WLAN power amplifier may thus use feedback to identify the distortion of the signal output from the WLAN power amplifier with circuitry to compensate for this distortion. Distortions in the phase and amplitude of the WLAN signal are thus compensated for in the WLAN power amplifier using predistortion circuitry. This predistortion circuitry is set to compensate based only on the WLAN transmission power. In order to avoid adjusting this predistortion, in certain embodiments the second RF signal, in this case a Bluetooth RF signal, may be sufficiently small that the contribution of the Bluetooth RF signal to the total power of the WLAN RF signal and the Bluetooth RF signal when combined is small. This means that the impact on the predistortion calibration is within a threshold amount. In some embodiments, this condition may be satisfied based on a 10 dB difference between the two RF signals. In other embodiments, other differences may be used.

Further, as described above, wireless communication systems include regulatory limits on electromagnetic emissions, based not only on output power, but also on emissions frequencies, to avoid interfering with adjacent frequency bands used by other RF systems. In certain embodiments, combining of RF signals using a switching network may generate frequency emissions that are outside of the allowable frequency spectrum at power levels that are unacceptable. Certain embodiments may include elements for monitoring such unacceptable RF emissions, and may disable TTC or set TTC criteria to disable TTC operation when TTC operating conditions are known to generate such violations.

Figure 4:
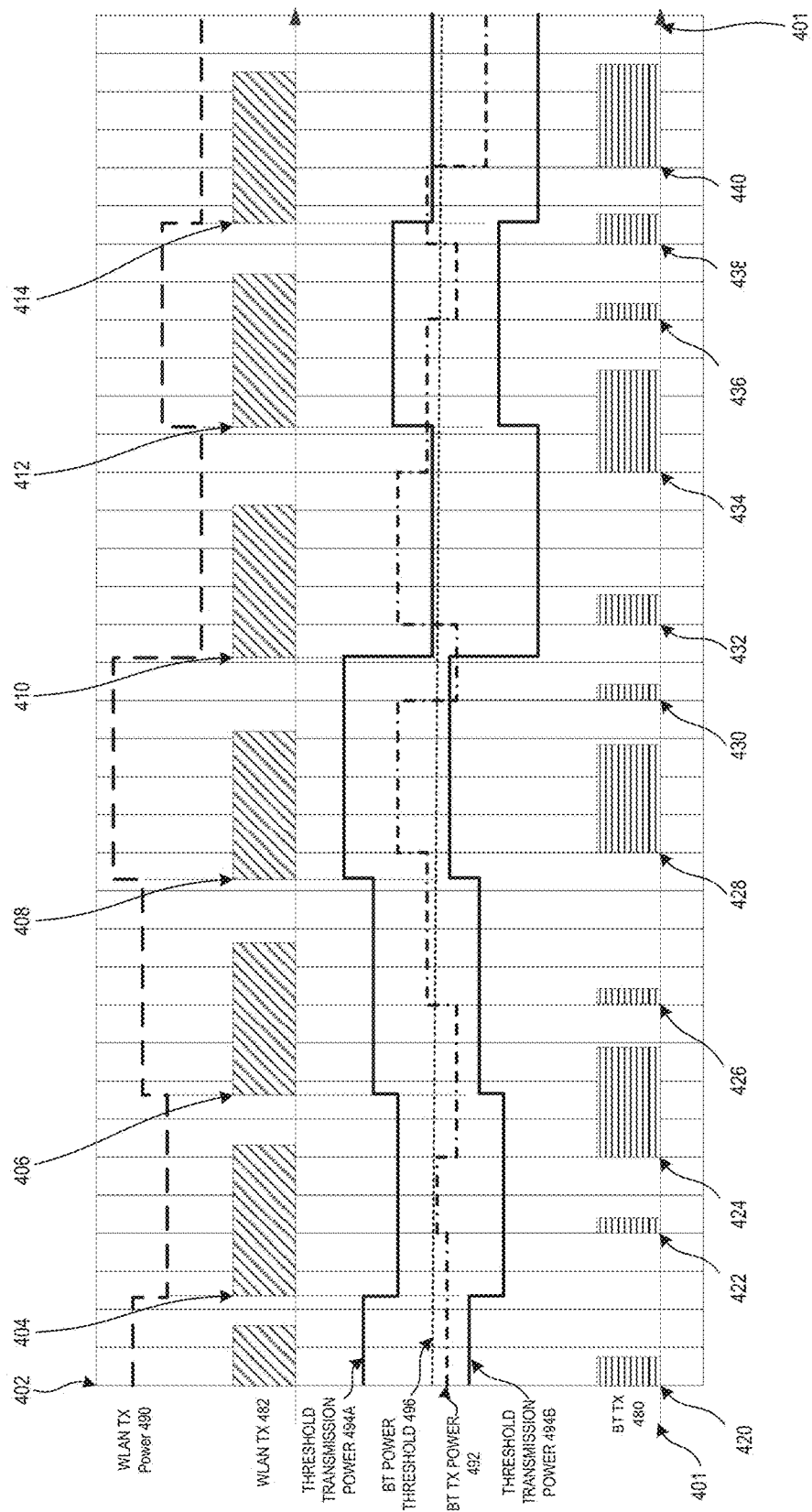
FIG. 4 illustrates aspects of apparatus operation for transmit concurrency in a wireless device by conditioned signal combining in accordance with some example embodiments.

FIG. 4 illustrates aspects of apparatus operation for transmit concurrency in a wireless device by conditioned signal combining in accordance with some example embodiments. Particularly, FIG. 4 illustrates a timeline 401. During the time shown by timeline 401, Bluetooth transmissions 480 and WLAN transmissions 482 occur as part of operation of a single wireless communication device. As discussed above, circuitry for both the WLAN transmissions 482 and the Bluetooth transmissions 480 may be integrated in a single integrated circuit, apparatus, or assembly as part of a wireless communication device, and may use TTC circuitry such as apparatus 200 to combine the transmissions for output to a single antenna.

The timeline 401 additionally illustrates different transmission periods 402-440. Each transmission period 402-440 is associated with different transmission conditions which occur at the beginning of each new transmission segment. Transmission periods 402-414 as illustrated begin at a time when a new WLAN transmission 482 segment begins, and transmission periods 420-440 begin when a new Bluetooth transmission 480 segment begins.

At the beginning of each transmission period 402-440, TTC circuitry assesses WLAN transmission power 490 and Bluetooth transmission power 492 as part of a determination of whether TTC operation is to be enabled. At the beginning of each WLAN transmission 482 segment, the WLAN transmission power 490 may be adjusted for the associated transmission period 402-414. Based on the WLAN transmission power 490, threshold transmission power 494 between upper threshold transmission power 494A and lower threshold transmission power 494B are shifted. In various embodiments, threshold transmission power 494 may include an upper threshold, a lower threshold, or both as shown in FIG. 4. The threshold transmission power 494 thus may be considered as implementing the degradation margin discussed above, and causes the Bluetooth transmissions 480 to use a separate Bluetooth power amplifier when the power differences between the WLAN transmission power 490 and the Bluetooth transmission power 492 are not within an appropriate range for combining, both at a high and a low power difference threshold. For example, at the beginning of transmission period 404, the WLAN transmission power 490 decreases, and so the window for threshold transmission power 494 shifts down. Similarly, at the beginning of transmission period 412, the WLAN transmission power 490 increases, and so the threshold transmission power 494 window increases. At each transmission period, if the Bluetooth transmission power 492 is outside of the threshold transmission power 494, then TTC operation is disabled.

Additionally, for each transmission period, the Bluetooth transmission power 492 is compared against a Bluetooth power threshold 496. This Bluetooth power threshold 496 is constant during operation, and may be set based on characteristics of the Bluetooth power amplifier, or by system design settings. If the Bluetooth transmission power 492 is above the Bluetooth power threshold 496, then TTC operation is disabled, and the Bluetooth transmission 480 segment for that time period is sent using a separate Bluetooth power amplifier.

Thus, TTC operation may be enabled when the Bluetooth transmission power 492 is both within the threshold transmission power 494 and below the Bluetooth power threshold

496. While these two conditions are used for enabling TTC operation, additional criteria may be used as well in other embodiments. For example, historical data showing that the WLAN transmissions 482 and the Bluetooth transmissions 480 attempt to transmit at the same time (illustrated in the timeline 401 in sections where the WLAN transmissions 482 overlap the Bluetooth transmissions 480) for a threshold percentage of the time, or where this conflict occurs at a threshold rate, may be used as a condition to enable or disable TTC operation.

As illustrated, the Bluetooth transmission power 492 is within the threshold transmission power 494 during transmission periods 402-410, 412, 420-428, 436, 438, and 440. The Bluetooth transmission power 492 falls outside of the threshold transmission power 494 during transmission periods 414, 430, 432, and 434. The Bluetooth transmission power 492 is below the Bluetooth power threshold 496 during transmission periods 402-406, 410, 420-424, 430, 436, and 440. The Bluetooth transmission power 492 is above the Bluetooth power threshold 496 during transmission periods 408, 412, 414, 426, 428, 432, 434, and 438.

As described above, in the embodiment shown by timeline 401, TTC operation is enabled only when the Bluetooth transmission power 492 is both within the threshold transmission power 494 and above the Bluetooth power threshold 496. Assuming no other criteria are used by a wireless mobile device with operation illustrated by FIG. 4, TTC operation for such a device would be enabled during transmission periods 402-406, 410, 420-424, 436, and 440.

Figure 5:
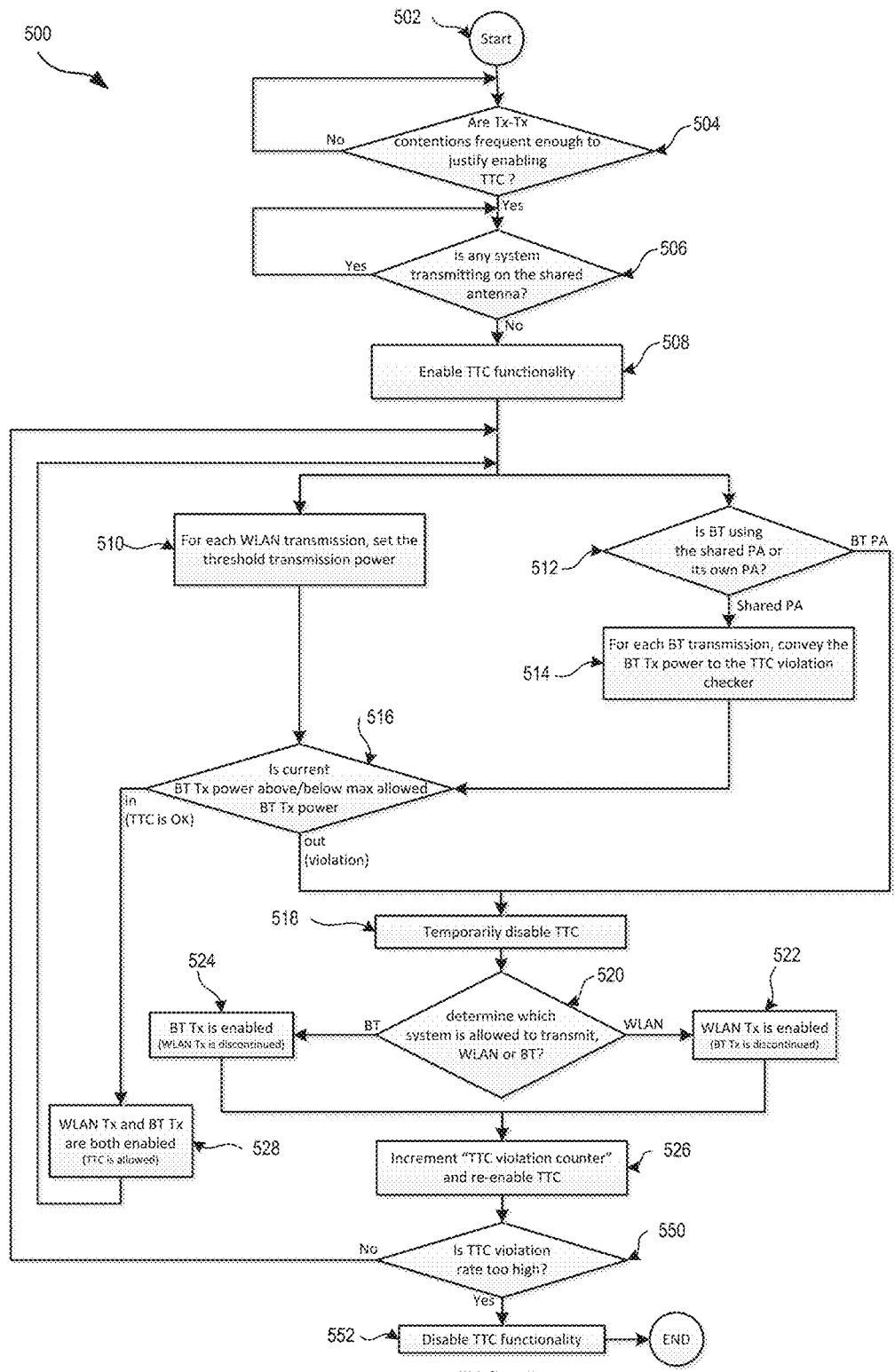
FIG. 5 is a flow chart illustrating aspects of apparatus operation for transmit concurrency in a wireless device by conditioned signal combining in accordance with some example embodiments.

FIG. 5 illustrates a flow chart showing aspects of a method 500 for apparatus operation for transmit concurrency in a wireless device by conditioned signal combining in accordance with some example embodiments. At operation 502, the device starts a TTC operation process. This may be initiated based on a wireless communication device power on, selection of an option to enable TTC functionality using a user interface or a device trigger, or any other such start option.

The device then, in operation 504, checks to see if historical conflicts between two different RF signal systems, illustrated herein as WLAN and Bluetooth systems, have occurred frequently enough to justify enabling TTC operation. If not, the device may continue gathering information on transmission periods when conflicts between the two RF systems occur, and may periodically re-check whether the frequency of these contentions have risen above a threshold frequency or priority level.

If the contentions meet criteria for enabling TTC, then in operation 506 the device checks to see if either RF system is currently transmitting. The device delays any adjustments to the system until the antenna is free in order to avoid introducing errors into any currently transmitting segment of data. Once there is a pause where no transmission is occurring, TTC functionality is enabled in operation 508. This TTC functionality enable may be considered in certain embodiments as activating control logic that may be used to set a switching signal such as the TTC enable 216 of the apparatus 200 of FIG. 2. Tx-Tx concurrent transmission does not actually begin until a switching network has been set following assessment of transmission conditions, and until an actual contention period begins when both RF systems are attempting to transmit at the same time.

In operation 512, the device determines whether the Bluetooth system is set to use a standalone power amplifier such as the Bluetooth power amplifier 210 based on Bluetooth system conditions. This may be based solely on comparison of a Bluetooth transmission power against a Bluetooth power threshold as illustrated by the Bluetooth power threshold 496 of FIG. 4. In other embodiments, other criteria may be used. If the Bluetooth system determines that Bluetooth signals will use the standalone power amplifier, then the device proceeds to operation 518 and temporarily disables TTC operation. This may be done by setting a switch to keep the RF signals at separate power amplifiers while maintaining TTC functionality by continuing to analyze device status to determine whether to adjust the switching network. If a conflict occurs during this time, the device will decide in operation 520 which RF signal will be allowed to use the shared antenna for given periods of time, with antenna access for each system switching on and off in operations 522 and 524. The device then increments a TTC violation counter in operation 526 and checks a TTC violation rate in operation 550. If the TTC violation rate is too high, TTC functionality is disabled in operation 552 and the method ends. Disabling of TTC functionality means that the logic for determining whether to combine RF signals is disabled, and a switching network is set to keep the RF signals separate. This may be done to conserve power in environments where the criteria for TTC operation are sufficiently infrequent that the resource usage in maintaining the possibility of TTC outweighs the benefits of TTC in avoiding the alternating disablement of RF systems in operations 522 and 524. If the TTC violation rate is not above a threshold or ending trigger in operation 550, then the device proceeds to continue monitoring new transmissions in operations 510 and 512.

Returning to operation 512, if the device determines based on Bluetooth criteria that the Bluetooth system is available to use the shared power amplifier, such as the WLAN power amplifier 220, then in operation 514 the Bluetooth transmission power is sent to TTC violation or validity check circuitry for each Bluetooth transmission segment. The Bluetooth transmission power is combined in the validity check circuitry with information about the WLAN transmission power that is used to set the threshold transmission power in operation 510. In operation 516, the validity check circuitry of the device compares the Bluetooth transmission power from operation 514 with the threshold transmission power from operation 510 to determine if the Bluetooth transmission power is inside the threshold or outside the threshold. If the Bluetooth transmission power is outside the threshold, then operation 516 proceeds to operation 518, and then continues from operation 518 as described above. If the Bluetooth transmission power is inside the threshold transmission power, then at operation 528 an enable signal is sent to set the switching network to route RF signals from both RF systems to the shared power amplifier, and both RF systems are enabled for transmission at the same time. This may be implemented as logic to enable encoding and output of analog signals from digital to analog elements of the two separate RF systems to RF source inputs such as the Bluetooth RF source input 240 and the WLAN RF source input 250 at the same time as described above. The device then returns to monitoring new transmission segments in operations 510 and 512 to determine if TTC operation should continue or be temporarily disabled, or if TTC functionality should end, based on operating conditions as described above.

Figure 6:
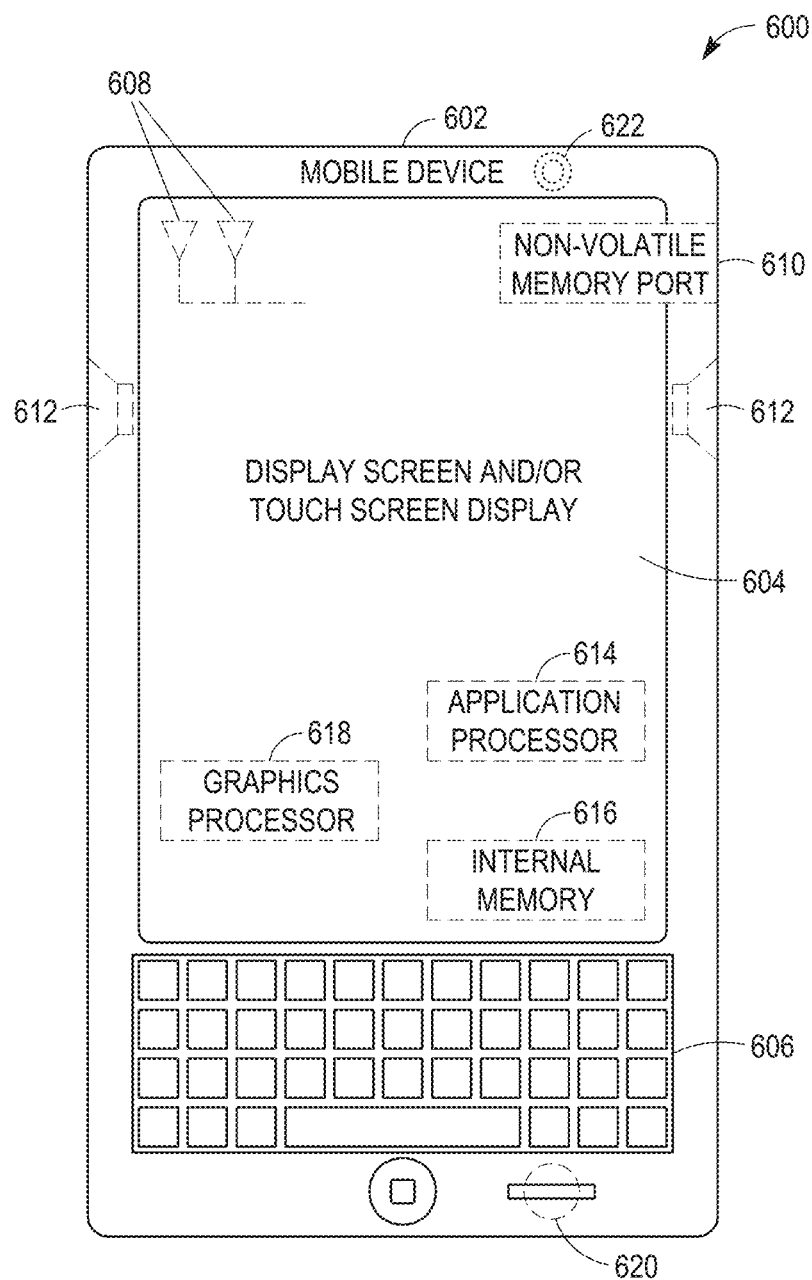
FIG. 6 illustrates aspects of a wireless device which can use an apparatus for conditioned signal combining in accordance with some example embodiments.

FIG. 6 illustrates an example of a wireless device 600. The wireless device 600 can include one or more antennas 608 within a housing 602 that are configured to communicate with a hotspot, base station (BS), Evolved Node B, or other type of WLAN or wireless wide area network (WWAN) access point. The wireless device 600 can be configured to communicate using multiple wireless communication standards, including standards selected from 3GPP LTE, WiMAX, High Speed Packet Access (HSPA), Bluetooth, and Wi-Fi standard definitions. The wireless device 600 can communicate using separate antennas for each wireless communication standard or shared antennas for multiple wireless communication standards. The wireless device 600 can communicate in a WLAN, a wireless personal area network (WPAN), and/or a WWAN. The wireless device 600 may include an apparatus such as the apparatus 200 of FIG. 2 that enables separate RF systems to transmit using a single antenna of the antennas 608 as described above. For example, the wireless device 600 may include separate processing circuitry to generate and output both Bluetooth and WLAN analog signals, with an apparatus such as the apparatus 200 controlled by TTC logic to combine the signals when TTC criteria are met, and with circuitry to manage alternating transmission sharing when TTC criteria are not met.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

One example embodiment is an apparatus of a wireless communication device configured for Tx-Tx transmission concurrency (TTC). One implementation of such an apparatus comprises a first input configured to accept a first radio frequency (RF) signal; a second input different from the first input and configured to accept a second RF signal; validity check circuitry configured to check a transmission power for the first RF signal against a first threshold transmission power; a standalone power amplifier having a standalone power amplifier input, predistortion circuitry, and a standalone power amplifier output coupled to an antenna output; a shared power amplifier comprising a shared power amplifier input coupled to the second input and a shared power amplifier output coupled to the antenna output; and a switching network controlled by the validity check circuitry and configured to couple the first input to the standalone power amplifier input when the transmission power for the first RF signal is above the first threshold transmission power and to couple the first input to the shared power amplifier input when the transmission power for the first RF signal is less than the first threshold transmission power.

Additional embodiments may be structured with the apparatus further comprising contention identification circuitry configured to identify a transmission conflict for an antenna coupled to the antenna output.

Additional embodiments may be structured wherein the first RF signal is a Bluetooth signal and wherein the second RF signal is a wireless local area network (WLAN) signal; and wherein an output transmission power from the antenna is associated with an out of band transmission limitation.

Additional embodiments may be structured wherein the contention identification circuitry is further configured to identify a conflict rate for use of the antenna by the first RF signal and the second RF signal.

Additional embodiments may be structured wherein the contention identification circuitry is further configured to set a separate transmission state based at least in part on a determination that the conflict rate is below a conflict threshold.

Additional embodiments may be structured wherein the contention identification circuitry is further configured to set a transmission concurrency state based at least in part on a determination that the conflict rate is above a conflict threshold.

Additional embodiments may be structured with the apparatus further comprising TTC control circuitry configured to temporarily disable the transmission concurrency state in response to a determination by the validity check circuitry that a current transmission power of the first RF signal is above the first threshold transmission power.

Additional embodiments may be structured wherein the TTC control circuitry is further configured to increment a TTC violation counter in response to the determination by the validity check circuitry that the current transmission power of the first RF signal is above the first threshold transmission power; compare the TTC violation counter against a threshold TTC violation rate; and disable the transmission concurrency state and enable a separate transmission state when the TTC violation counter exceeds the threshold TTC violation rate.

Additional embodiments may be structured wherein the first threshold transmission power is set based on a maximum WLAN transmission power minus a degradation margin.

Additional embodiments may be structured wherein the shared power amplifier is configured for highly linear operation with an associated power consumption increase.

Another example embodiment is a method for Tx-Tx transmission concurrency (TTC) comprising verifying that a first radio frequency (RF) signal and a second RF signal for a first transmission period meet a set of TTC criteria; verifying that a shared antenna for the first RF signal and the second RF signal is not in use at a beginning of the first transmission period; selecting a first threshold transmission power for the first RF signal such that a first maximum transmission power comprising a first transmission power of the first RF signal and a second transmission power of the second RF signal for the first transmission period is below a TTC threshold transmission power; and in response to a determination that the first transmission power for the first RF signal during the first transmission period is below the first threshold transmission power: configuring a switching network to combine the first RF signal and the second RF signal during the first transmission period and amplifying the first RF signal and the second RF signal using a shared power amplifier during the first transmission period.

Additional implementations of such an embodiment may operate where the first RF signal is a Bluetooth signal and the second RF signal is a wireless local area network (WLAN) signal conforming with one or more standards of Institute of Electrical and Electronic Engineers (IEEE) 802.11; and wherein the set of TTC criteria comprises the TTC threshold transmission power and a contention rate comprising a frequency with which the first RF signal and the second RF signal attempt to use the shared antenna within the first transmission period.

Additional implementations of such an embodiment may operate with the method further comprising: selecting a second threshold transmission power for the first RF signal such that a second maximum transmission power comprising a third transmission power of the first RF signal and a fourth transmission power of the second RF signal for a second transmission period is below the TTC threshold transmission power; and in response to a determination that the third transmission power is above the second threshold transmission power: configuring the switching network into a non-TTC configuration during the second transmission period; amplifying the first RF signal using a standalone power amplifier that is separate from the shared power amplifier during the second transmission period; and amplifying the second RF signal using the shared power amplifier during the second transmission period.

Another example embodiment is a non-transitory computer readable medium comprising instructions that, when executed by one or more processors of a wireless communication device, configure the wireless communication device to verify that transmission contentions for a first radio frequency (RF) signal and a second RF signal meet a set of Tx-Tx transmission concurrency (TTC) criteria. The instructions in such an embodiment also configure the device to, for each transmission segment associated with the second RF signal: select a threshold transmission power for the first RF signal based on a transmission power of the second RF signal for an associated transmission segment; compare a transmission power of the first RF signal to the threshold transmission power for the associated transmission segment; and set a TTC status for the associated transmission segment based on the comparison of the transmission power for the first RF signal with the threshold transmission power for the associated segment.

Additional embodiments of such a computer readable medium be structured where the instructions to set the TTC status comprise instructions to: in response to a determination that a first transmission power for a first segment of the first RF signal is below the threshold transmission power: configure a switching network to combine the first RF signal and the second RF signal; and amplify the first segment of the first RF signal and a first segment of the second RF signal using a shared power amplifier.

Still further examples of such a computer readable medium may be structured where the instructions further cause the wireless communication device to: for each transmission segment, increment a TTC violation counter when the first transmission power for the first RF signal is above the threshold transmission power; determine a TTC violation rate; and disable TTC operation if the TTC violation rate is above a TTC violation threshold.

Another embodiment is device for Tx-Tx transmission concurrency (TTC) comprising: a Bluetooth (BT) power amplifier; a first matching network coupling the BT power amplifier to a silicon output; a wireless local area network (WLAN) power amplifier; a second matching network coupling the WLAN power amplifier to the silicon output; a third matching network coupling an input of the BT power amplifier to a BT radio frequency (RF) input and a first end of a TTC coupler; and a fourth matching network coupling the WLAN power amplifier to a second end of the TTC coupler and a WLAN RF input; wherein the TTC coupler comprises a TTC control input that sets a TTC coupler state based on a set of TTC selection criteria.

Additional embodiments of such a device may be structured as further comprising: an antenna coupled to the silicon output; wherein a first criterion of the set of TTC selection criteria comprises an antenna use conflict rater based on conflicting use of the antenna by signals from the BT power amplifier and the WLAN power amplifier.

Additional embodiments of such a device may be structured as further comprising: a BT digital to analog converter (DAC) coupled to the third matching network and the first end of the TTC coupler via the BT RF input; wherein a second criterion of the set of TTC selection criteria is based at least in part on an output power of the BT DAC.

Additional embodiments of such a device may be structured as further comprising: a WLAN RF source coupled to the WLAN RF input; wherein a third criterion of the set of TTC selection criteria is based at least in part on an output power of the WLAN RF source.

FIG. 6 also shows a microphone 620 and one or more speakers 612 that can be used for audio input and output from the wireless device 600. A display screen 604 can be a liquid crystal display (LCD) screen, or another type of display screen such as an organic light emitting diode (OLED) display. The display screen 604 can be configured as a touch screen. The touch screen can use capacitive, resistive, or another type of touch screen technology. An application processor 614 and a graphics processor 618 can be coupled to an internal memory 616 to provide processing and display capabilities. A non-volatile memory port 610 can also be used to provide data input/output options to a user. The non-volatile memory port 610 can also be used to expand the memory capabilities of the wireless device 600. A keyboard 606 can be integrated with the wireless device 600 or wirelessly connected to the wireless device 600 to provide additional user input. A virtual keyboard can also be provided using the touch screen. A camera 622 located on the front (display screen) side or the rear side of the wireless device 600 can also be integrated into the housing 602 of the wireless device 600. Any such elements may be used to generate information that may be communicated via aggregated links as described in various embodiments herein.

Figure 7:
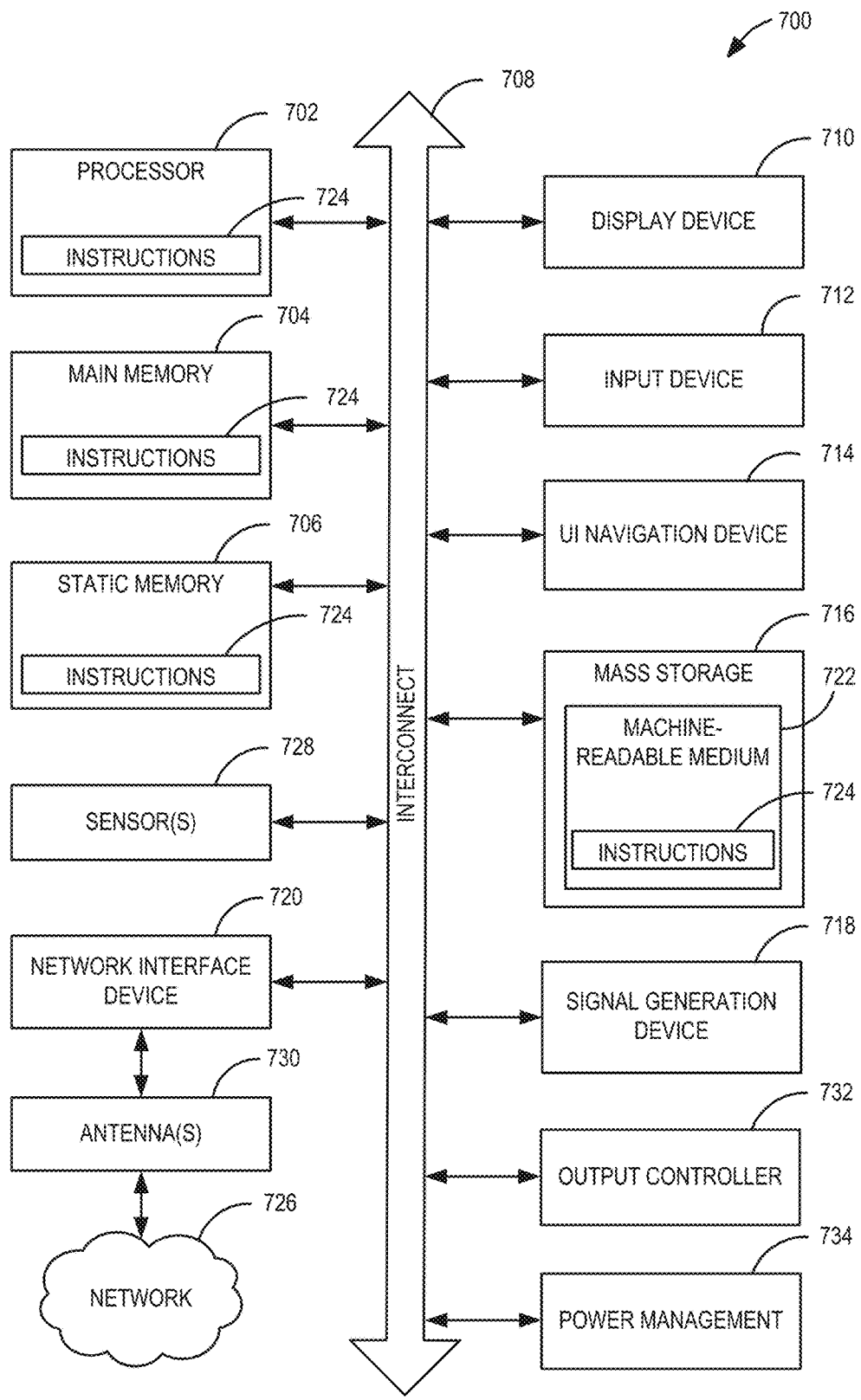
FIG. 7 is a block diagram illustrating an example computer system machine which may be used with various aspects of example embodiments described herein.

FIG. 7 illustrates a block diagram of a device that may be used to implement various aspects of systems, devices, and methods for implementing transmit concurrency by conditioned signal combining, according to some embodiments. FIG. 7 illustrates an example computer system machine 700 upon which any one or more of the methodologies herein discussed can be run, including wireless communication devices 102, 110, and 130, any wireless device described herein, any network element or server described herein, or any other such device described herein. In various alternative embodiments, the computer system machine 700 operates as a standalone device or can be connected (e.g., networked) to other machines. In a networked deployment, the computer system machine 700 can operate in the capacity of either a server or a client machine in server-client network environments, or it can act as a peer machine in peer-to-peer (or distributed) network environments. The computer system machine 700 can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system machine 700 includes one or more processors 702 (e.g., a central processing unit (CPU), a graphics processing unit (GPU), or both), a main memory 704, and a static memory 706, which communicate with each other via an interconnect 708 (e.g., a link, a bus, etc.). The computer system machine 700 can further include a device display unit 710, an alphanumeric input device 712 (e.g., a keyboard), and a user interface (UI) navigation device 714 (e.g., a mouse). In one embodiment, the video display unit 710, input device 712, and UI navigation device 714 are a touch screen display. The computer system machine 700 can additionally include a mass storage device 716 (e.g., a drive unit), a signal generation device 718 (e.g., a speaker), an output controller 732, a power management controller 734, a network interface device 720 (which can include or operably communicate with one or more antennas 730, transceivers, or other wireless communications hardware), and one or more sensors 728, such as a Global Positioning System (GPS) sensor, compass, location sensor, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, the static memory 706, and/or the processor 702 during execution thereof by the computer system machine 700, with the main memory 704, static memory 706, and processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding, or carrying instructions for execution by the machine and that cause the machine to perform any one or more of the methodologies of the present disclosure, or that is capable of storing, encoding, or carrying data structures utilized by or associated with such instructions.

The instructions 724 can further be transmitted or received over a communications network 726 using a transmission medium via the network interface device 720 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible media to facilitate communication of such software.

Various techniques, or certain aspects or portions thereof, may take the form of program code (e.g., instructions) embodied in tangible media, such as floppy diskettes, CD-ROMs, hard drives, non-transitory computer readable storage media, or any other machine-readable storage medium wherein, when the program code is loaded into and executed by a machine, such as a computer, the machine becomes an apparatus for practicing the various techniques. In the case of program code execution on programmable computers, the programmable computer may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The programmable computer may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 702.11, near field communication, and Bluetooth communication standards. Various alternative embodiments may use a variety of other WWAN, WLAN, and WPAN protocols and standards in connection with the techniques described herein. These standards include, but are not limited to, other standards from 3GPP (e.g., HSPA+, UMTS), IEEE 702.16 (e.g., 702.16p), or Bluetooth (e.g., Bluetooth 6.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (e.g., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the programmable computer can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification may be referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

What is claimed is:

1. An apparatus of a wireless communication device configured for Tx-Tx transmission concurrency (TTC), the apparatus comprising:
a first input configured to accept a first radio frequency (RF) signal;
a second input configured to accept a second RF signal;
a validity check circuitry configured to check a transmission power for the first RF signal against a first threshold transmission power;
a standalone power amplifier having a standalone power amplifier input, a predistortion circuitry, and a standalone power amplifier output capable of being coupled to an antenna output;
a shared power amplifier comprising a shared power amplifier input coupled to the second input and a shared power amplifier output capable of being coupled to the antenna output;
a switching network controlled by the validity check circuitry and configured to couple the first input to the standalone power amplifier input when the transmission power for the first RF signal is above the first threshold transmission power and to couple the first input to the shared power amplifier input when the transmission power for the first RF signal is less than or equal to the first threshold transmission power; and
a contention identification circuitry configured to identify a transmission conflict for an antenna coupled to the antenna output, wherein the contention identification circuitry is further configured to identify a conflict rate for use of the antenna by the first RF signal and the second RF signal.

2. The apparatus of claim 1 wherein the first RF signal is a Bluetooth signal and wherein the second RF signal is a wireless local area network (WLAN) signal; and
wherein an output transmission power from the antenna is associated with an out of band transmission limitation.

3. The apparatus of claim 1 wherein the contention identification circuitry is further configured to set a separate transmission state based on whether the conflict rate is below a conflict threshold.

4. The apparatus of claim 1 wherein the contention identification circuitry is further configured to set a transmission concurrency state based on whether the conflict rate is above a conflict threshold.

5. The apparatus of claim 4 further comprising:
TTC control circuitry configured to temporarily disable the transmission concurrency state in response to a determination by the validity check circuitry that a current transmission power of the first RF signal is above the first threshold transmission power.

6. The apparatus of claim 5 wherein the TTC control circuitry is further configured to:
increment a TTC violation counter in response to the determination by the validity check circuitry that the current transmission power of the first RF signal is above the first threshold transmission power;
compare the TTC violation counter against a threshold TTC violation rate; and
disable the transmission concurrency state and enable a separate transmission state if the TTC violation counter exceeds the threshold TTC violation rate.

7. The apparatus of claim 1 wherein the first threshold transmission power is set based on a different between maximum WLAN transmission power and a degradation margin.

8. The apparatus of claim 1 wherein the shared power amplifier is configured for highly linear operation with an associated power consumption increase.

9. A device for Tx-Tx transmission concurrency (TTC) comprising:
a Bluetooth (BT) power amplifier;
a first matching network coupling the BT power amplifier to a silicon output;
a wireless local area network (WLAN) power amplifier;
a second matching network coupling the WLAN power amplifier to the silicon output;
a third matching network coupling an input of the BT power amplifier to a BT radio frequency (RF) input and a first end of a TTC coupler; and
a fourth matching network coupling the WLAN power amplifier to a second end of the TTC coupler and a WLAN RF input;
wherein the TTC coupler comprises a TTC control input that sets a TTC coupler state based on a set of TTC selection criteria.

10. The device of claim 9 further comprising:
an antenna coupled to the silicon output;
wherein a first criterion of the set of TTC selection criteria comprises an antenna use conflict rater based on conflicting use of the antenna by signals from the BT power amplifier and the WLAN power amplifier.

11. The device of claim 10 further comprising:
a BT digital to analog converter (DAC) coupled to the third matching network and the first end of the TTC coupler via the BT RF input;
wherein a second criterion of the set of TTC selection criteria is based at least in part on an output power of the BT DAC.

12. The device of claim 11 further comprising:
a WLAN RF source coupled to the WLAN RF input;
wherein a third criterion of the set of TTC selection criteria is based at least in part on an output power of the WLAN RF source.

* * * * *